(12) United States Patent
Daley, III

(10) Patent No.: US 7,889,496 B2
(45) Date of Patent: *Feb. 15, 2011

(54) BAG COMPUTER DISPLAY PANEL PROP ASSEMBLY

(76) Inventor: Charles A. Daley, III, P.O. Box 184, Karon P.O, T. Karon, A. Muang, Phuket (TH) 83100

( * ) Notice: Subject to any disclaimer, the term of this patent is extended or adjusted under 35 U.S.C. 154(b) by 0 days.

This patent is subject to a terminal disclaimer.

(21) Appl. No.: 12/384,952

(22) Filed: Apr. 13, 2009

(65) Prior Publication Data

US 2009/0201637 A1    Aug. 13, 2009

Related U.S. Application Data

(63) Continuation-in-part of application No. 11/796,920, filed on May 1, 2007, now abandoned.

(60) Provisional application No. 61/125,861, filed on Apr. 30, 2008.

(51) Int. Cl.
*G06F 1/16* (2006.01)
(52) U.S. Cl. ............... 361/679.55; 361/679.03
(58) Field of Classification Search ............ 361/679.03, 361/679.55; 206/320
See application file for complete search history.

(56) References Cited

U.S. PATENT DOCUMENTS

| | | | | |
|---|---|---|---|---|
| 5,445,266 A * | 8/1995 | Prete et al. | ................... | 206/320 |
| 5,887,723 A * | 3/1999 | Myles et al. | ................ | 206/760 |
| 6,167,413 A * | 12/2000 | Daley, III | ................... | 708/139 |
| 6,269,948 B1 * | 8/2001 | Jackson | ...................... | 206/320 |
| 6,283,299 B1 * | 9/2001 | Lee | ............................. | 206/760 |
| 6,763,942 B1 * | 7/2004 | Yeh | ............................. | 206/320 |
| 6,956,614 B1 * | 10/2005 | Quintana et al. | ............ | 348/373 |
| 6,962,277 B2 * | 11/2005 | Quintana et al. | ............ | 224/262 |
| 7,265,970 B2 * | 9/2007 | Jordan | .................... | 361/679.27 |
| 2005/0011920 A1 * | 1/2005 | Feng | ........................... | 224/275 |
| 2005/0103815 A1 * | 5/2005 | Lee et al. | ..................... | 224/275 |
| 2006/0113213 A1 * | 6/2006 | Daley | ......................... | 206/576 |
| 2006/0163303 A1 * | 7/2006 | Trutanich | .................... | 224/576 |
| 2007/0199844 A1 * | 8/2007 | Daley | ......................... | 206/320 |
| 2007/0201201 A1 * | 8/2007 | Daley, III | .................... | 361/683 |
| 2008/0192421 A1 * | 8/2008 | Daley | ......................... | 361/681 |
| 2008/0273298 A1 * | 11/2008 | Daley | ......................... | 361/683 |
| 2009/0009476 A1 * | 1/2009 | Daley, III | .................... | 345/168 |
| 2009/0009938 A1 * | 1/2009 | Daley, III | .................... | 361/680 |
| 2009/0046416 A1 * | 2/2009 | Daley, III | .............. | 361/679.55 |
| 2009/0107877 A1 * | 4/2009 | Daley, III | .................... | 206/576 |
| 2009/0107878 A1 * | 4/2009 | Daley, III | .................... | 206/576 |

(Continued)

*Primary Examiner*—Lisa Lea-Edmonds

(57) ABSTRACT

Disclosed is an assembly to hold the angular position of a display panel relative to the bag front to which it is pivotally attached. The display panel is attached to the bag so it can pivot flat against the bag front or away from the bag into the line of sight of the computer operator/bag wearer. The display back and bag front have holders meant to match the ends of a prop bar which extends between the two. There are three embodiments; 1) a rigid bar between the two holders, 2) a semi-rigid bar held pivotally with the first holder and the opposite bar end sliding through the second holder with friction to hold the display panel position, 3) a rigid bar held pivotally with a first holder having a hinge with friction to hold the display panel position and the opposite bar end sliding along the second holder.

30 Claims, 13 Drawing Sheets

U.S. PATENT DOCUMENTS

| | | | |
|---|---|---|---|
| 2009/0141446 A1* | 6/2009 | Daley, III | 361/679.55 |
| 2009/0185342 A1* | 7/2009 | Daley, III | 361/679.27 |
| 2009/0190296 A1* | 7/2009 | Daley, III | 361/679.27 |
| 2009/0225508 A1* | 9/2009 | Daley, III | 361/679.27 |
| 2009/0225509 A1* | 9/2009 | Daley, III | 361/679.29 |
| 2009/0236247 A1* | 9/2009 | Daley, III | 206/320 |
| 2009/0284908 A1* | 11/2009 | Daley, III | 361/679.17 |

* cited by examiner

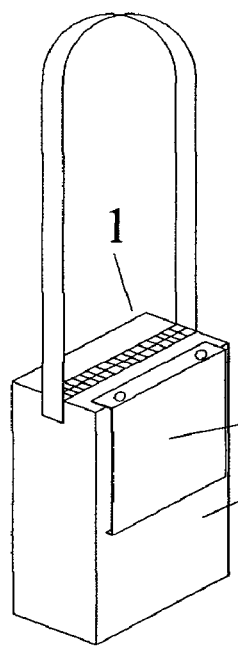
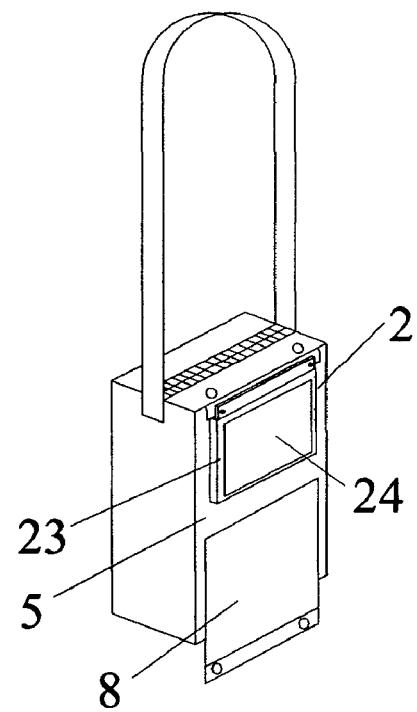
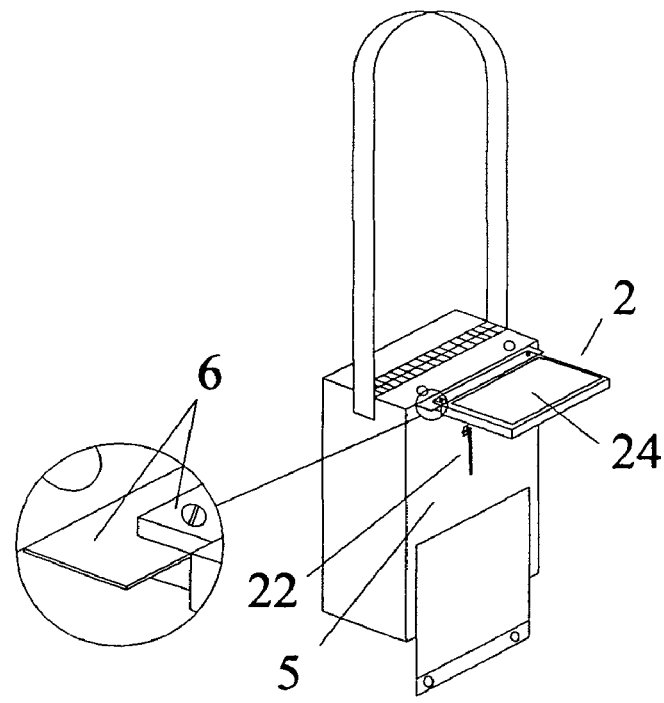
FIG 1
FIG 2
FIG 4
FIG 3

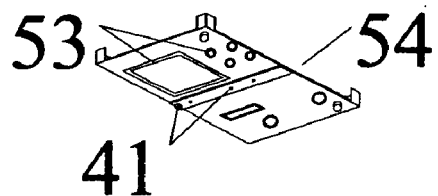
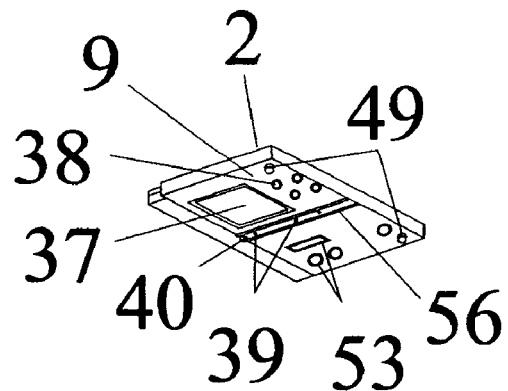
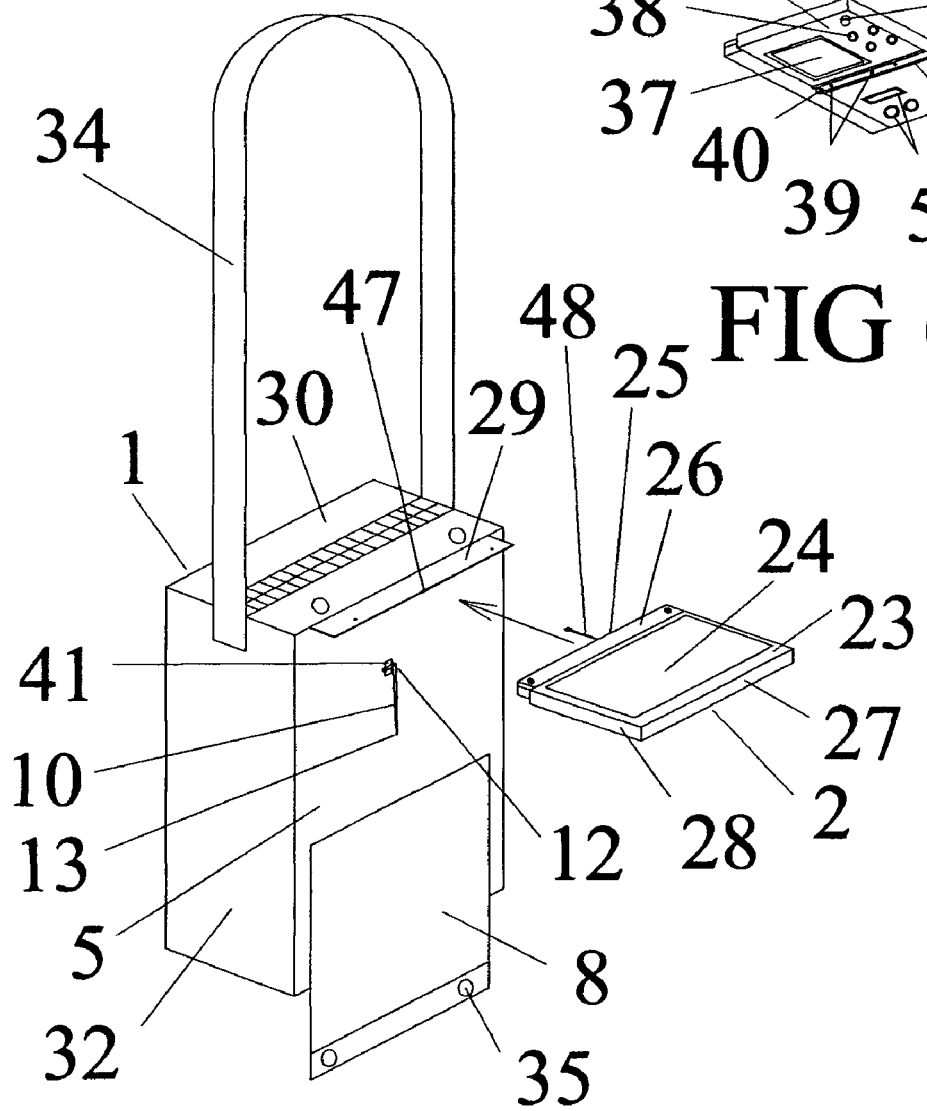

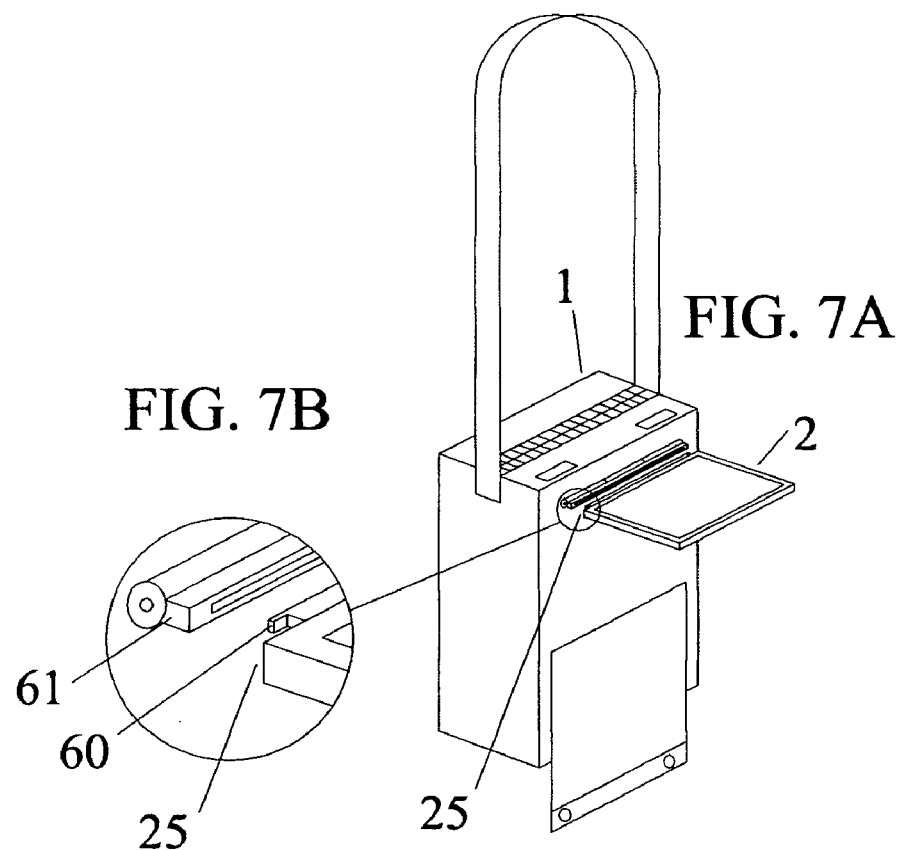
FIG. 7A
FIG. 7B
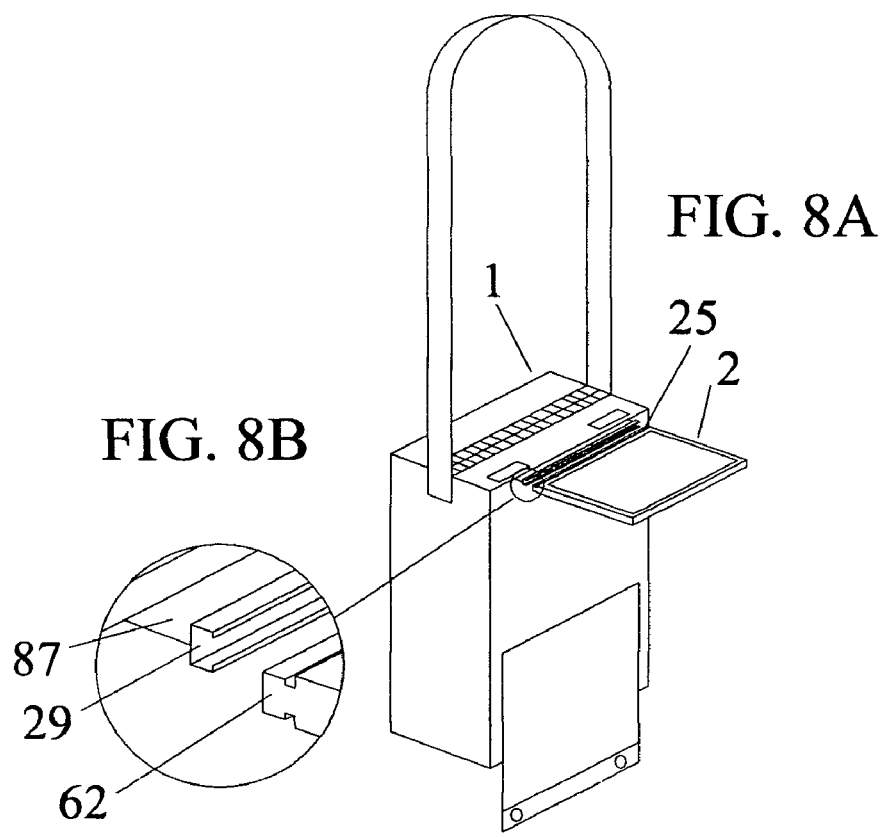
FIG. 8A
FIG. 8B

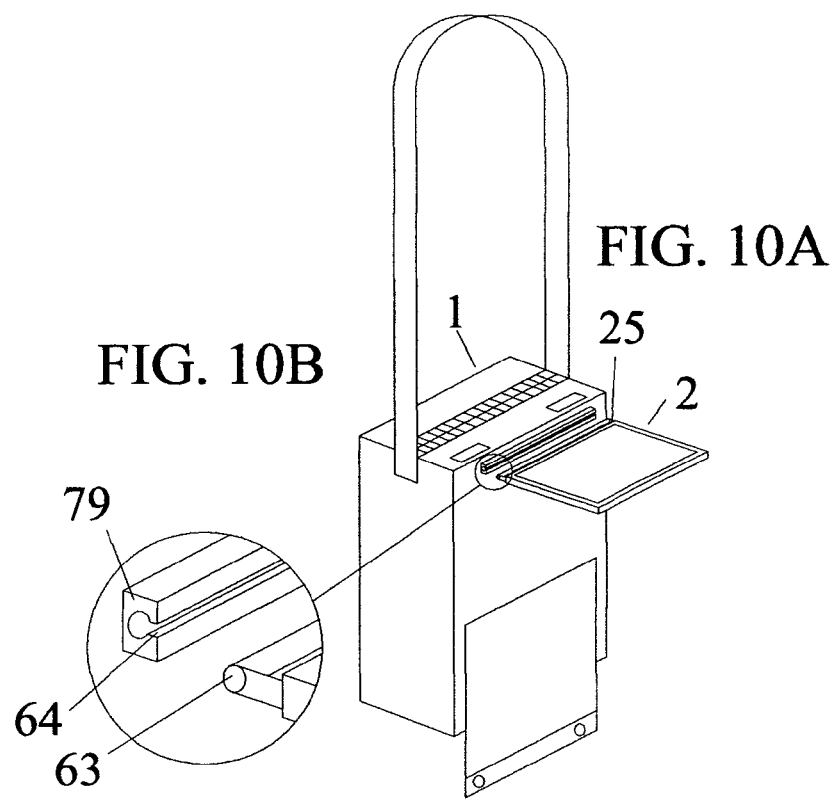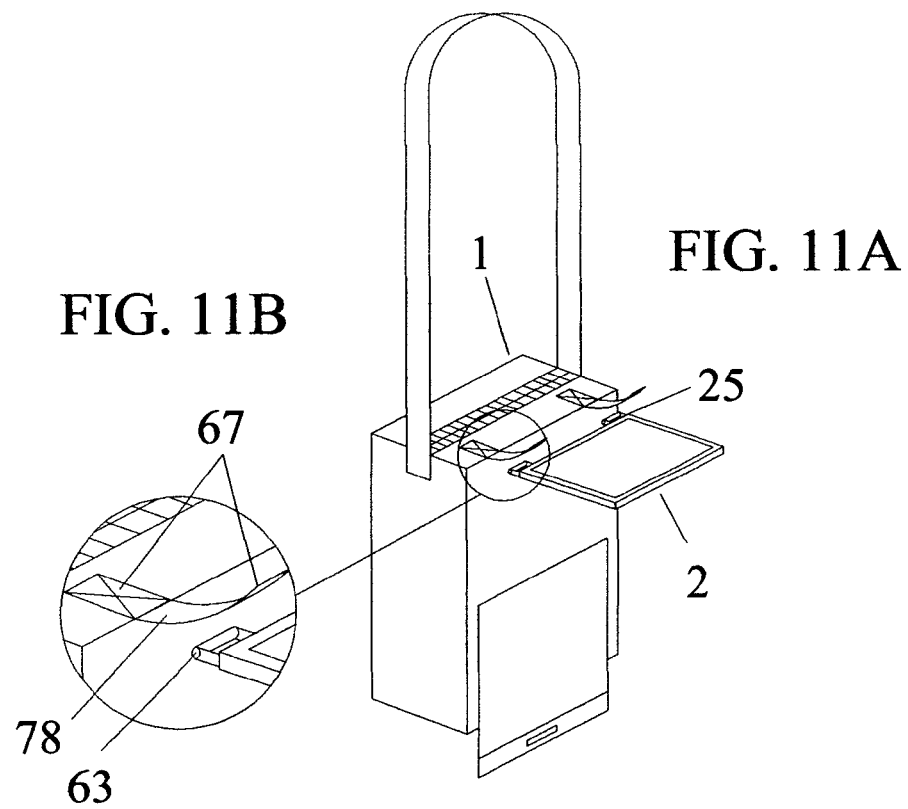

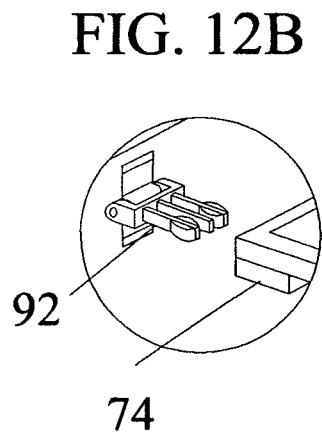
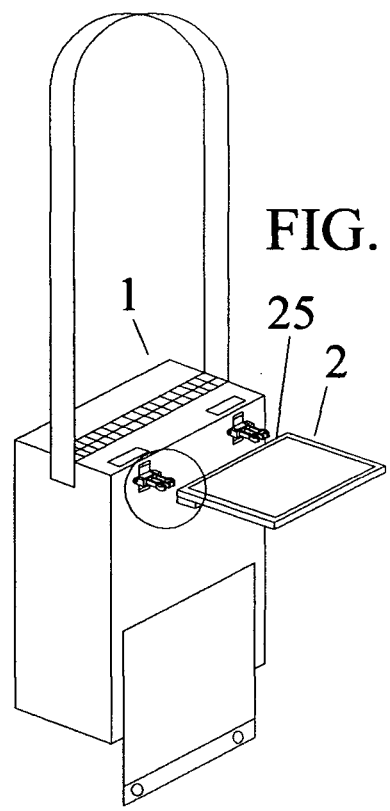
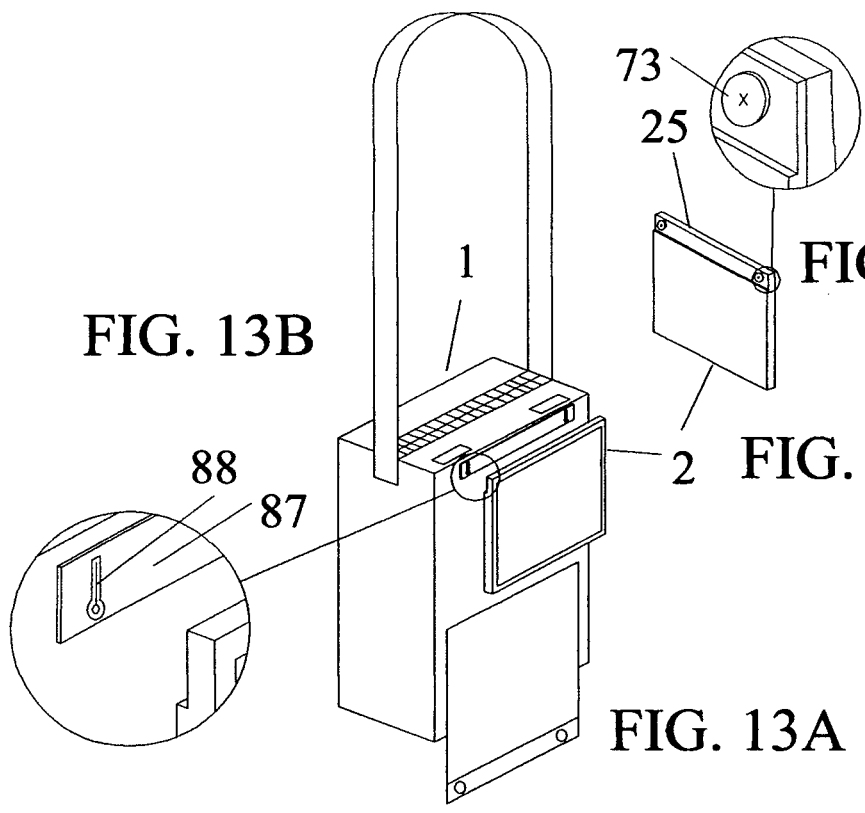

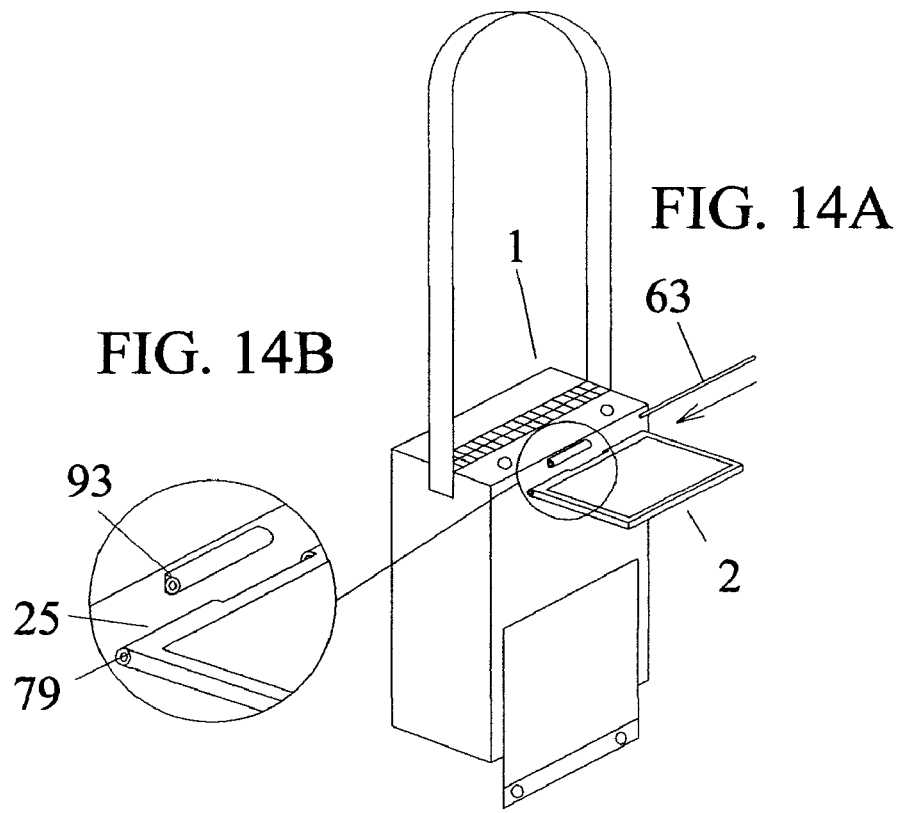
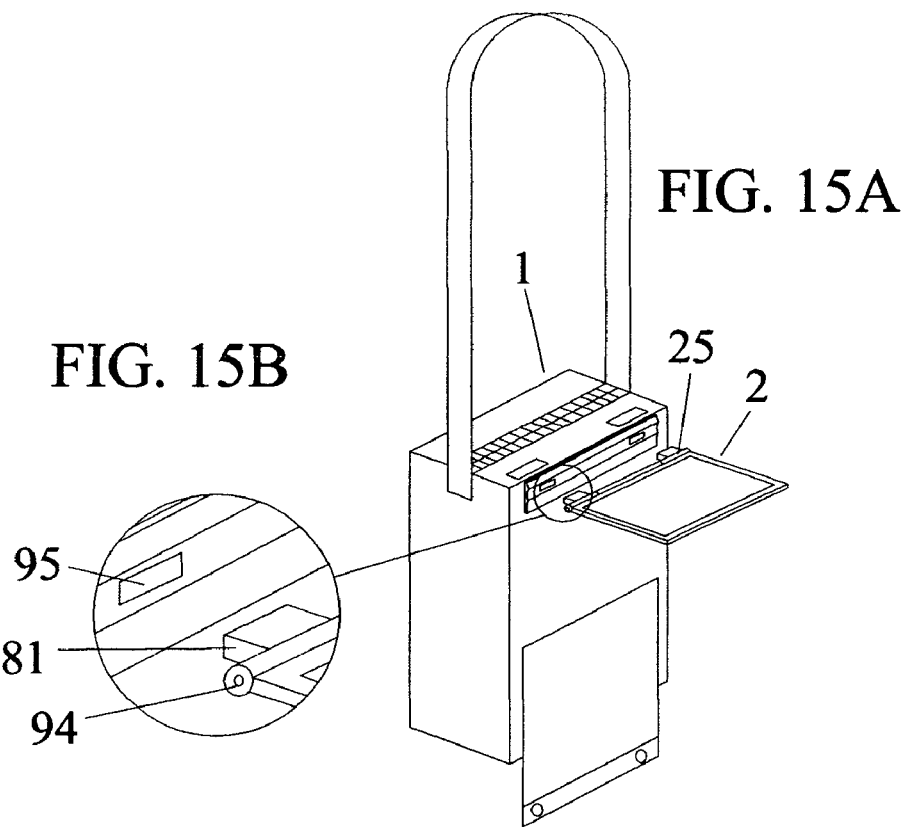

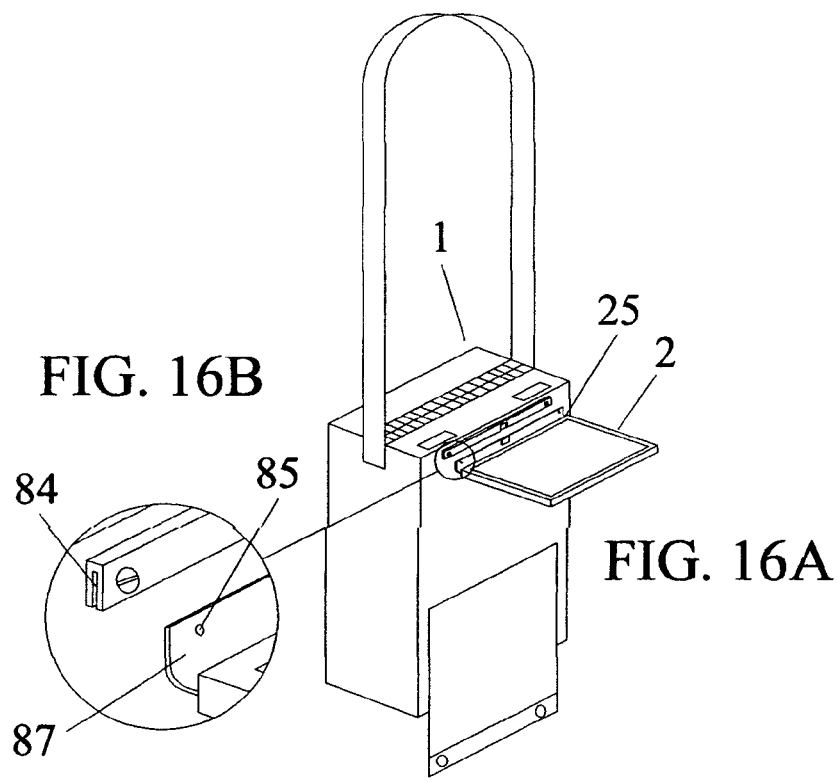
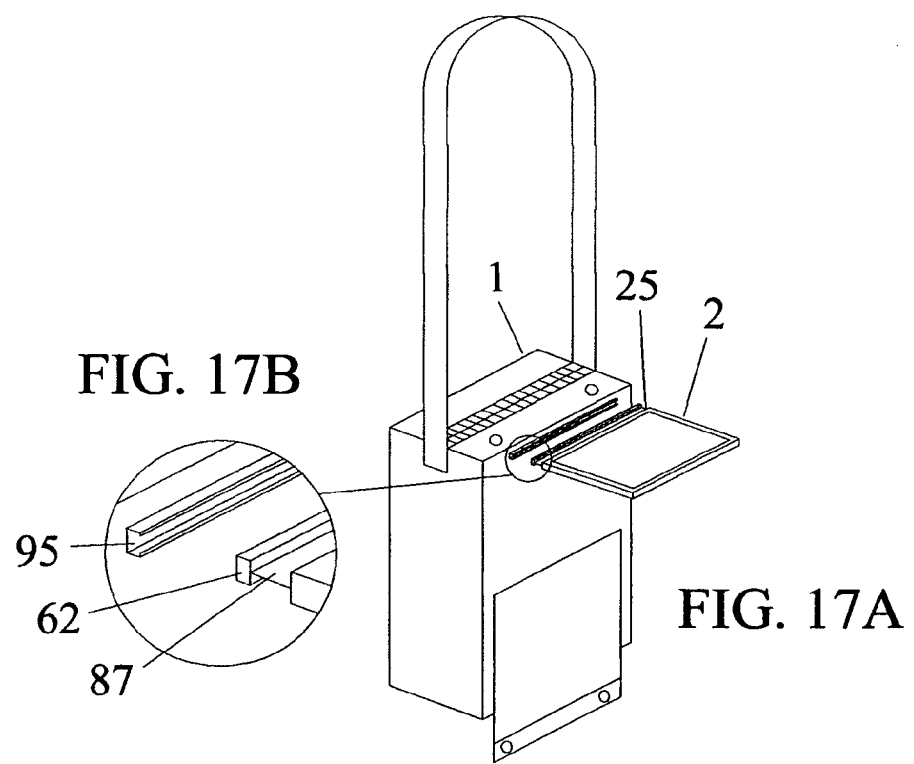

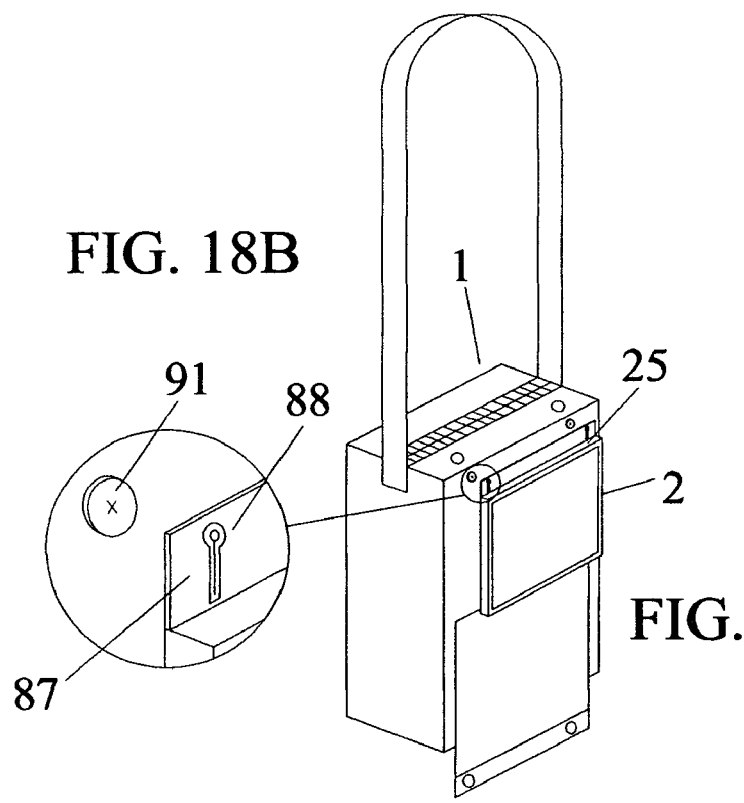
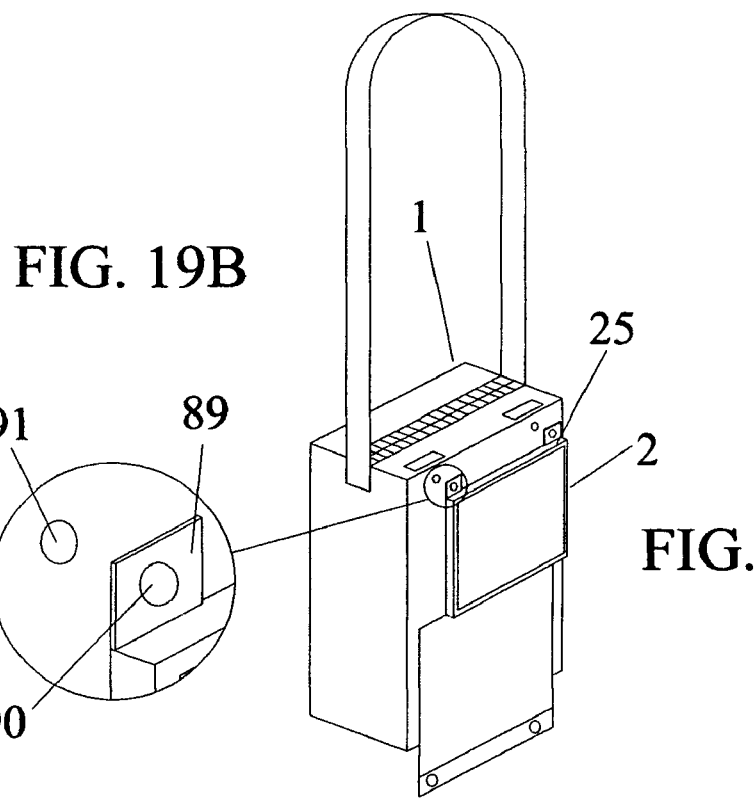

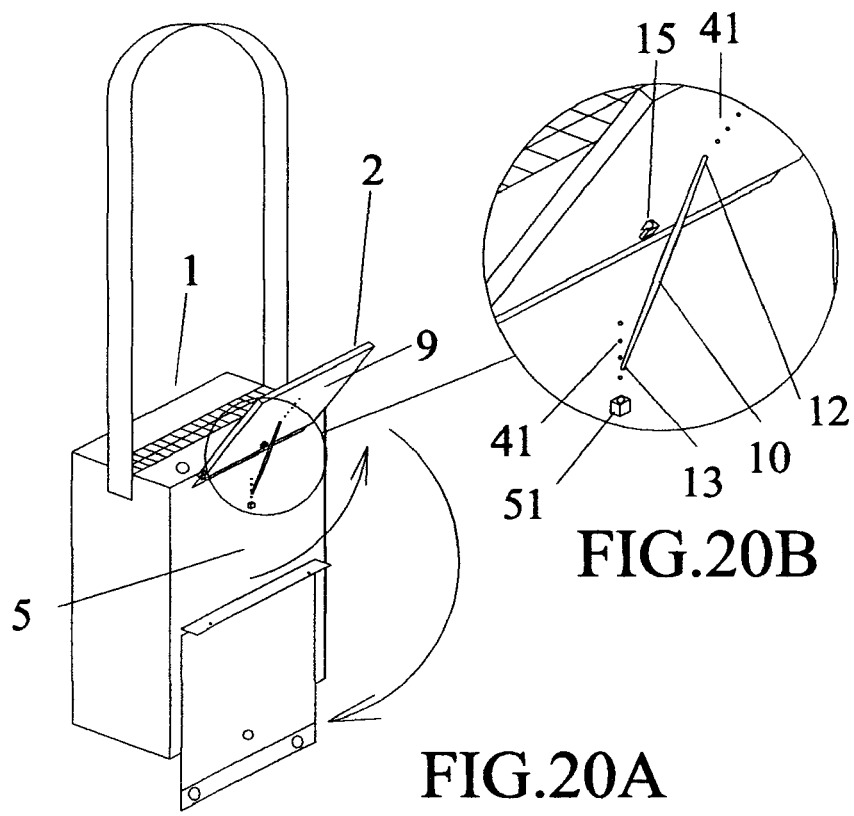
FIG.20B
FIG.20A
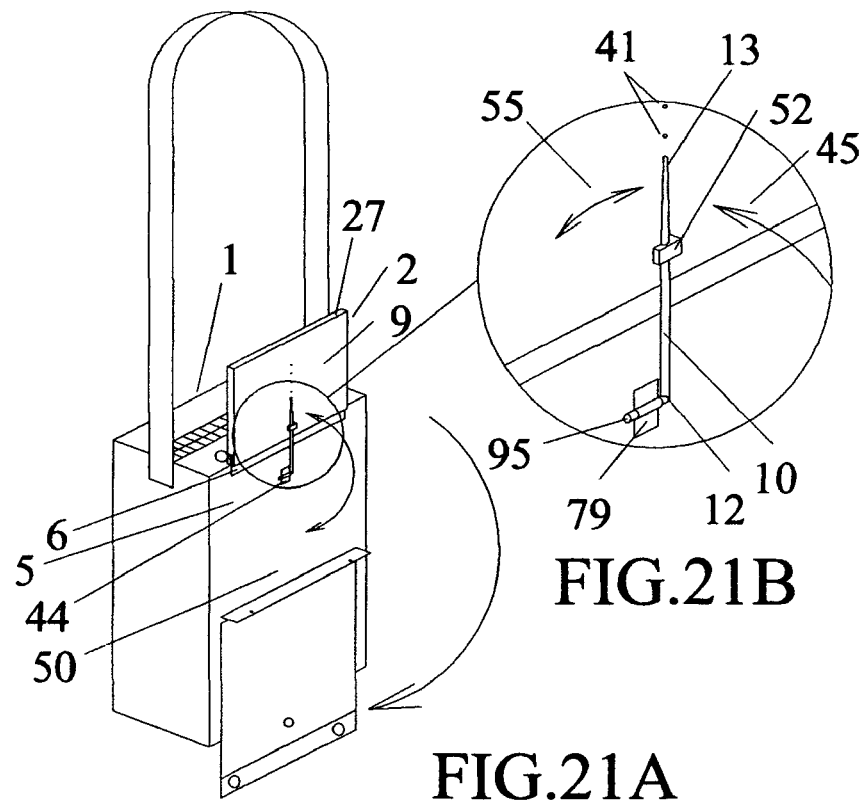
FIG.21B
FIG.21A

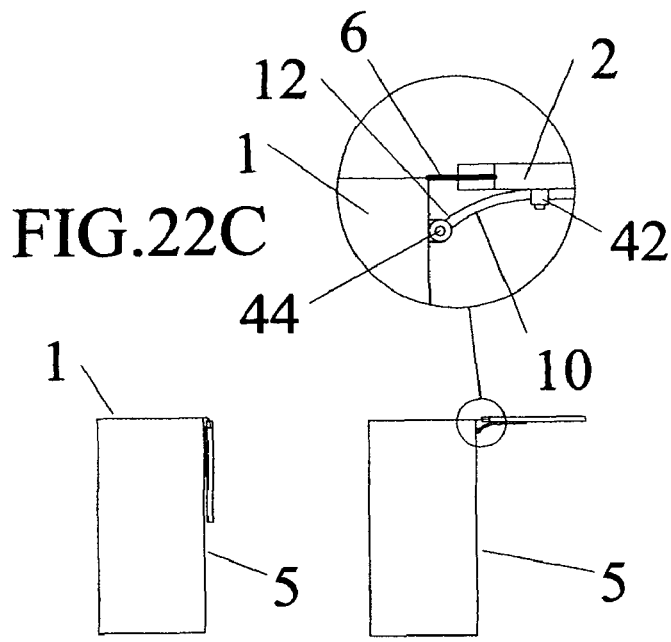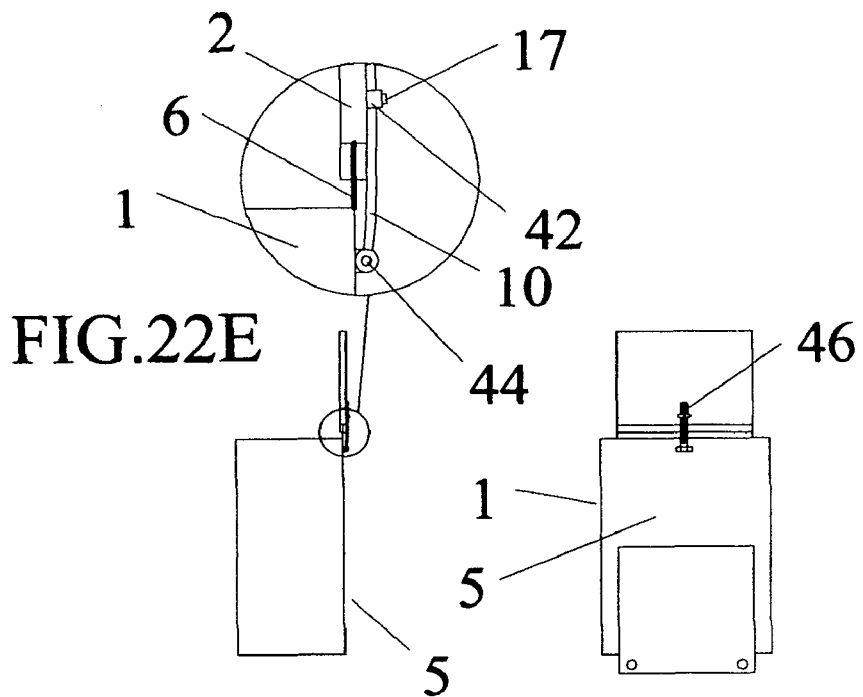

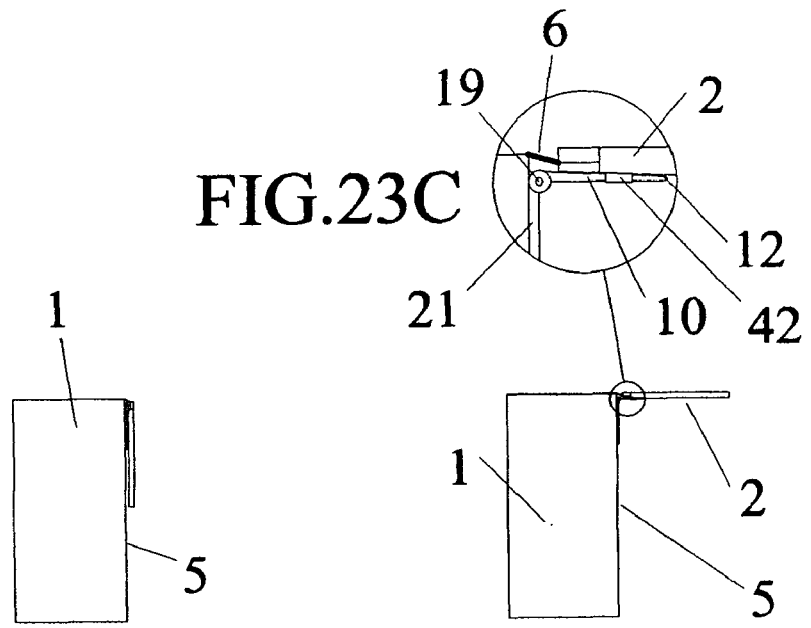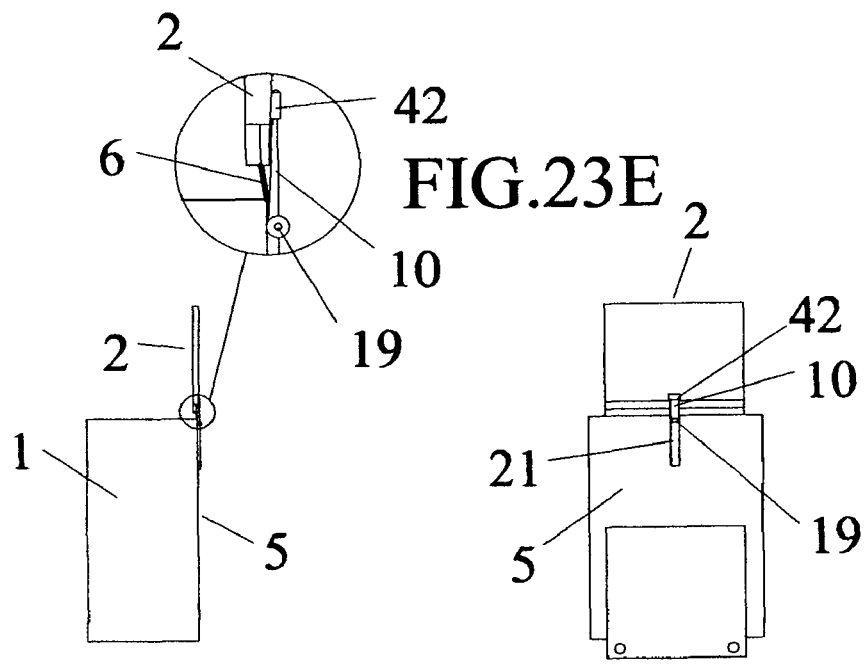

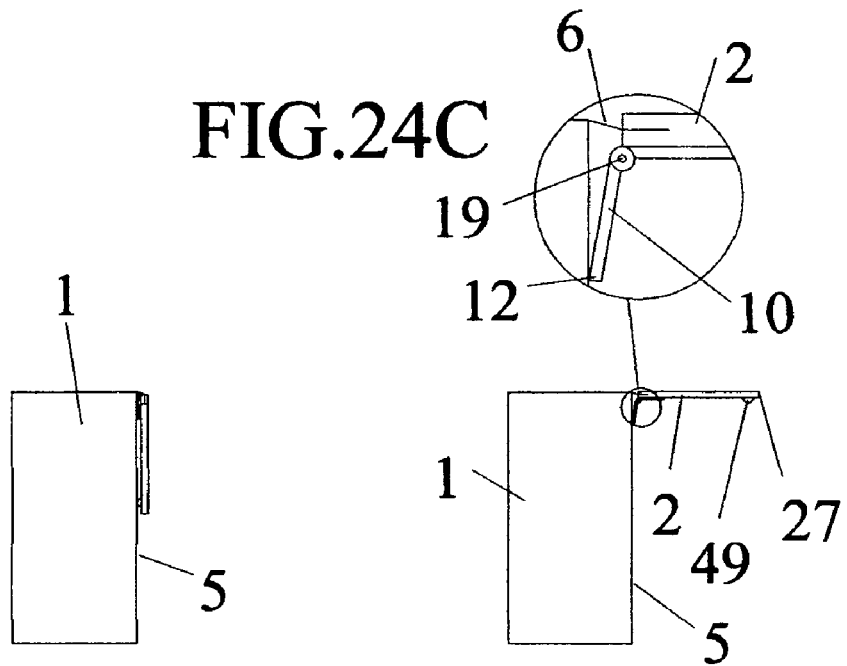
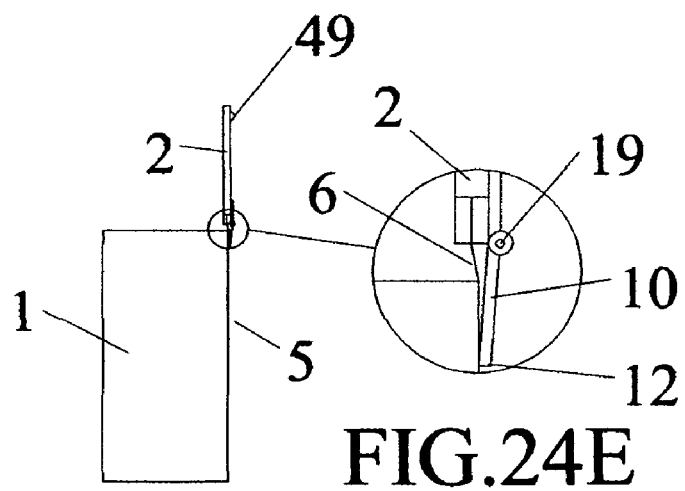
FIG.24A FIG.24B FIG.24C FIG.24D FIG.24E

BAG COMPUTER DISPLAY PANEL PROP ASSEMBLY

CROSS-REFERENCE TO RELATED APPLICATIONS

This application is a Continuation-In-Part and claims the filing benefit under 35 U.S.C. §120 of U.S. application Ser. No. 11/796,920, filed May 1, 2007 now abandoned and is incorporated herein by reference.

This application claims the filing benefit under 35 U.S.C. §119(e) of U.S. Provisional Application No. 61/125,861, filed on Apr. 30, 2008, the entire teachings of which are incorporated herein by reference.

TECHNICAL FIELD

The present invention relates to a computer designed for mobile use.

BACKGROUND OF THE INVENTION

Bag computers are composed of a bag and computer joined so that the display panel pivots around the top front end of the bag so it can lay approximately flat against the bag front when stored or pivot with its display facing outward into the line of sight of the operators when in use. There may be a keyboard lower down on the bag front and there may be manual controls on the back of the display panel.

The computer and bag were described in application Ser. Nos. 11/796,920 and 11/799,011. This application is a continuation on those inventions.

One means of removable attaching the display panel to the bag is to use a pivoting flexible fabric attachment flap, made for example of bag material, to which the display panel is clamped, slid, clipped, etc. The flexible fabric mounts may have advantages over other ways of pivotally attaching the display panel to the bag in terms of manufacturing diversity, replaceability, simplicity, durability, inexpensiveness and light weight.

One disadvantage of flap mounting, though, is that pivoting flaps don't hold an angular position if the operators wants to, for example, view his computer without using his hands. One way to correct this problem, while still keeping the advantage of the flap mount, is to use a display panel prop. The display prop can be used to hold display panel angular position only when needed so that the operator has the option of having the display panel hold its position or pivot freely. The display panel back and bag front can be adapted for this purpose.

There are many displays panels with stands and props. Electronic displays have been supplied with table mounts with props, as are normal picture frames. These, of course, do not include a pivoting mount to match a bag nor do are they designed to hold the display between 0 and 180 degrees on a mobile bag surface without falling.

Displays are most commonly made to stand on tables with a base connecting to the bottom or back of the display panel. In more mobile and self contained computers, the computer panel becomes the base and the display panel hinges to it. Usually the support is assisted by a hinge with friction or ratcheting so that the hinge will hold any angular position between the display panel and computer panel.

Display panel props may be used for special purposes. In 317443 and 358583, pivotally connected display panel and computer panel combinations, use a display panel prop so the display panel lower edge can be positioned differently. The trifold computer, for example 5926364, is a type of note book computer with three panels which deploy from a flat storage position to a triangle-like upright position. Its third panel can be seen as a prop.

Some bag meant to hold computer have a way to support a display panel or whole computer. Support is usually from the top with straps as in the case of 5639004, 6381127, 5887777 and 6354477.

The bag computer has its display mounted near top front corner of the bag and cannot be suspended from above. Support with a prop from below is, then, desired. This requires the coordination of the display panel, bag, prop and the three connections between them. In addition a simple, inexpensive, light and replaceable way of propping would be preferable.

BRIEF DESCRIPTION OF THE INVENTION

A bag computer is a bag with a display panel, including input/output devices such as a display and graphic user input device, mounted to the exterior of the bag so it may pivot horizontally from a storage position flat against the bag's front wall to a position away from the bag's front wall where the wearer/operator may view it. The computing unit may be located in the display panel or may be attached to the bag's inside or outside surface.

Although the pivoting computer equipment mounts (PCEM), which pivotally hold the display panel to the bag, may be able to hold any angle of the display panel relative to the bag front, other simpler PCEMs, for example a flexible fabric mounting attachment, may not be able to do so. In this case, a display panel prop assembly may be employed to support the display panel at any angle. This assembly is composed of 1) a prop holder on the bag front, 2) a prop holder on the display panel back side and 3) a prop bar.

The display panel is panel-like with a front side facing away from the bag front when the panel is stored flat against the bag front and an opposite back side. There are four edges. There is a display on the front side and there may be controls on the back side. The display panel may be removable mounted to the bag.

There is a display panel mounting attachment on one edge which matches a bag mounting attachment on the bag and pivotally connects the display panel to the bag. The display panel mounting attachment and bag mounting attachment together form the PCEM. The PCEM includes an attachment and a hinge means to connect the display panel and bag and these may come in a variety of forms. The hinge means may be part of the bag mounting attachment or part of the display panel mounting attachment. Examples on the matching attachments used in the PCEM may include: 1) plug in clips, 2) clamp and flexible fabric, 3) lateral entry channels, 4) axle and bearing and 5) attachments, such as buttons, snaps or hook and loop, to match a flexible fabric hinge means.

The back side of the display panel may also include one or more prop holders to match the prop bar meant to extend between the bag front and display back. Examples of prop holders include:

A bar end prop holder, attaches to one end on the prop bar. A bar end prop holder may be, for example, sockets, notches, pins, hooks, slots.

A vertical prop holder holds the prop bar parallel to the display panel back and is meant to hold the display panel parallel to and above the bag front. A vertical prop holder may be, for example, a clip/snap fitting, lateral hook, cylinder, ring or split cylinder of flexible material.

A pivoting prop holder holds the prop bar end in a way that allows the prop bar to pivot relative to the display panel back. A pivoting prop holder may be, for example, loop or band of bag material, metal or plastic forming a bearing, axle/bearing hinge with fitting to match the prop bar, ball and socket joint with fitting to match the prop bar.

A sliding prop holder allows the prop bar to slide in it or along it. It may be designed to hold the prop bar along its length. It may be a track or guide along which a prop bar end and may slide.

The prop bar has a first and second end and these are designed to be complimentary to the holders on the display panel and bag. The two ends may be different to accommodate different holders. The prop bar sides may be designed to engage to a prop holder. The prop bar may be rigid or semi rigid.

The bag has a front wall, opposite back wall, top wall with an opening to access the bag interior, a bottom wall and two side walls. A strap is provided to secure the bag to the operator's body so two hands can be used in computer operation. There may be a pivoting cover to cover the display panel when stored and there may be access through the bag's (front) wall for an electrical connection to the interior of the bag.

The bag has a bag mounting attachment to match the display panel's mounting attachment and pivotally connect it to the bag.

The bag front wall may include one or more prop holders which may be of the same types as the prop holder on the display back side and previously described in that context. The prop holder on the bag and the prop holder on the display panel may be of different types so as to match different ends on the prop bar.

The display panel prop assembly includes one or more prop holders on the bag front, one or more prop holders on the display panel back side and a prop bar. To hold the display panel at one or more angles relative to the bag's front wall, the display panel is moved into place and the prop bar is positioned between a bag's prop holder and a display panel's prop holder to maintain that particular angle. The prop bar has ends to match the prop holders and there may be different end fittings to match different prop holders depending of the particular display panel props assembly. The prop bar may have sides adapted to fits to and engage the prop holder so as to provide the friction or ratcheting needed to hold the position of the display panel. The prop bar may be rigid or semi rigid.

There are several embodiments of the display panel prop assembly. In one embodiment, the prop bar is rigid and fits between the prop holders on the bag front and display panel back side. The bar may be permanently held on one end with a pivoting prop holder so the prop bar is always readily accessible for use.

In another embodiment, the prop bar is semi rigid and permanently held to the bag or display panel back with a pivoting prop holder. The other holder is a sliding prop holder and is designed to slide along the prop bar with enough friction to hold any position of the display panel.

In a third embodiment, the prop bar is rigid with a first end permanently held to the bag or display panel back with a pivoting prop holder. Again, the other holder is a sliding prop holder and is designed to slide along the prop bar to hold any position of the display panel but, in this case, the friction to hold the display panel's angle is supplied by the hinge means in the pivoting prop holder. In a variation of this embodiment, the sliding prop holder is eliminated and the second end of the prop bar slides directly on the bag front or display back.

BRIEF DESCRIPTION OF THE SEVERAL VIEWS OF THE DRAWINGS

FIG. 1 This is a bag computer while not in use and the display panel stored and covered on the bag's front wall.

FIG. 2 This shown the bag computer with the cover open and the display exposed.

FIG. 3 This is the bag computer with the cover open and the display panel pivoted into the line of sight of the operator/wearer.

FIG. 4 This is a magnified view of the pivoting computer equipment mount connecting the display panel and bag and including a flexible fabric hinge means on the bag and a clamp on the display panel.

FIG. 5 This is the bag computer with the display panel and bag disconnected. The bag prop holder and prop bar can be seen on the bag front.

FIG. 6A This shows the back side of the display panel with controls and display panel prop holder.

FIG. 6B This shows a removable finger guide template to fit on the back side of the display panel. It includes prop holders.

FIG. 7A This view shows the pivoting computer equipment mount (PCEM) between the display panel and bag as a plug in post and clip attachments with the hinge on the bag.

FIG. 7B This is a magnified view of the PCEM in FIG. 7A.

FIG. 8A This view shows the PCEM as a lateral entry channel attachments with a flexible fabric hinge on the bag.

FIG. 8B This is a magnified view of the PCEM in FIG. 8A.

FIG. 10A This view shows the PCEM as a matching axle/bearing hinge and attachment.

FIG. 10B This is a magnified view of the PCEM in FIG. 10A.

FIG. 11A This view shows the PCEM as an axle on the display panel matching a flexible fabric strap with attachment to fold itself back on itself to form a loop bearing for the axle.

FIG. 11B This is a magnified view of the PCEM in FIG. 11A.

FIG. 12A This view shows the PCEM as two pivoting side release buckles with matching parts on the display panel and bag.

FIG. 12B This is a magnified view of the PCEM in FIG. 12A.

FIG. 13A This view shows the PCEM as two button and button hole attachments to pivotally connect the display panel to the bag.

FIG. 13B This is a magnified view of the PCEM in FIG. 13A showing in particular the button holes on the flexible fabric bag mounting attachment.

FIG. 13C This is a view of the back side of the display panel showing the button attachments on the display panel to hold it to the bag.

FIG. 13D This is a magnified view of the attachment edge of the display panel with button attachments.

FIG. 14A This view shows the PCEM as a bearing on the bag front and a matching bearing on the display panel with a removable axles to join the two.

FIG. 14B This is a magnified view of the PCEM in FIG. 14A.

FIG. 15A This view shows the PCEM as pivoting plugs with clips on the display panel matching stationary sockets on the bag.

FIG. 15B This is a magnified view of the PCEM in FIG. 15A.

FIG. 16A This view shows the PCEM as a flexible fabric hinge on the display panel matching a clamp on the bag.

FIG. 16B This is a magnified view of the PCEM in FIG. 16A.

FIG. 17A This view shows the PCEM as a flexible fabric hinge and lateral entry bar attachment on the display panel matching a channel on the bag.

FIG. 17B This is a magnified view of the PCEM in FIG. 17A.

FIG. 18A This view shows the PCEM as a flexible fabric hinge with button holes on the display panel with matching buttons on the bag.

FIG. 18B This is a magnified view of the PCEM in FIG. 18A.

FIG. 19A This view shows the PCEM as two flexible fabric tabs with snap attachments on the display panel matching snaps on the bag.

FIG. 19B This is a magnified view of the PCEM in FIG. 19A.

FIG. 20A This figure shows the bag computer with the cover pivoted down, the display panel pivoted out and the display panel prop ready for mounting in the display panel and bag prop holders.

FIG. 20B This magnification of FIG. 20A shows detail of the prop bar and prop holders.

FIG. 21A This figure shows the bag computer with the cover pivoted down, the display panel pivoted out and the display panel prop pivoted away from the bag front for mounting one end into the display panel prop holders.

FIG. 21B This magnification of FIG. 21A shows detail of the prop bar and prop holders.

FIG. 22A This is a profile view of a bag computer with the display panel folded against the bag front for storage.

FIG. 22B This is a profile view of a bag computer with the display panel pivoted away from the bag front for viewing from above.

FIG. 22C This is a magnification of the PCEM area of the bag computer in FIG. 22B showing the display panel prop assembly using a semi rigid prop bar with pivoting prop holder on the bag front and friction producing sliding prop holder on the display back.

FIG. 22D This is a profile view of a bag computer with the display panel pivoted away from the bag front for viewing from in back of the bag.

FIG. 22E This is a magnification of the PCEM area of the bag computer in FIG. 22D showing the display panel prop assembly using a semi rigid prop bar with pivoting prop holder on the bag front and friction producing sliding prop holder on the display back.

FIG. 22F This is a frontal view of a bag computer with the display panel pivoted away from the bag front for viewing from in back of the bag. The display panel prop uses a semi rigid prop bar with pivoting prop holder on the bag front and friction producing sliding prop holder on the display back.

FIG. 23A This is a profile view of a bag computer with the display panel folded against the bag front for storage.

FIG. 23B This is a profile view of a bag computer with the display panel pivoted away from the bag front for viewing from above.

FIG. 23C This is a magnification of the PCEM area of the bag computer in FIG. 23B showing the display panel prop assembly using a rigid prop bar with friction producing pivoting prop holder on the bag front and sliding prop holder on the display back.

FIG. 23D This is a profile view of a bag computer with the display panel pivoted away from the bag front for viewing from in back of the bag.

FIG. 23E This is a magnification of the PCEM area of the bag computer in FIG. 23D showing the display panel prop assembly using a rigid prop bar with friction producing pivoting prop holder on the bag front and friction producing sliding prop holder on the display back.

FIG. 23F This is a frontal view of a bag computer with the display panel pivoted away from the bag front for viewing from in back of the bag. The display panel prop uses a rigid prop bar with friction producing pivoting prop holder on the bag front and sliding prop holder on the display back.

FIG. 24A This is a profile view of a bag computer with the display panel folded against the bag front for storage.

FIG. 24B This is a profile view of a bag computer with the display panel pivoted away from the bag front for viewing from above.

FIG. 24C This is a magnification of the PCEM area of the bag computer in FIG. 23B showing the display panel prop assembly using a rigid prop bar with friction producing pivoting prop holder on the display panel back side with the distal end of the prop bar rubbing directly on the bag front.

FIG. 24D This is a profile view of a bag computer with the display panel pivoted away from the bag front for viewing from in back of the bag.

FIG. 24E This is a magnification of the PCEM area of the bag computer in FIG. 23D showing the display panel prop assembly using a rigid prop bar with friction producing pivoting prop holder on the display panel back side with the distal end of the prop bar rubbing directly on the bag front.

DETAILED DESCRIPTION OF THE INVENTION

Figure 9A:
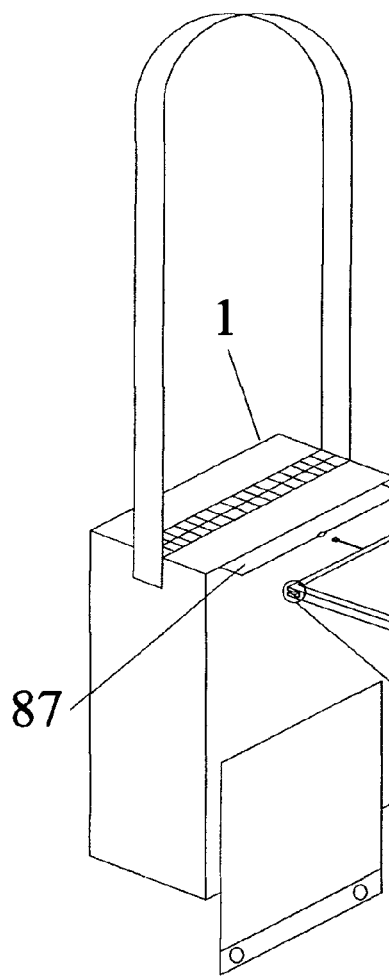
FIG. 9A This view shows the PCEM as a clamp attachment with a flexible fabric hinge on the bag.

A bag computer is a bag with a display panel, including input/output devices such as a display and graphic user input device, mounted to the exterior of the bag so it may pivot horizontally from a storage position parallel to and adjacent the bag's front wall to an operating position away from the bag's front wall where the wearer/operator may view it. The bag computer's computing unit may be found in the display panel or elsewhere mounted to the bag's interior or exterior and is electrically connected to the display panel. The bag computer may be seen as a system of components to facility the mobile use of a computer.

FIGS. 1, 2, 3 and 4 show how a bag computer is deployed and used. As shown in FIG. 1 the display panel, when mounted to the bag 1, is stored against the bag front 5 and may be covered with a cover, such as a cover flap 8 or rigid shaped cover. Shown in FIG. 2, when the cover 8 is repositioned, the display panel 2 is exposed for use. Here it can be seen that the display panel is in storage position with its front side 23, including display 24, and back side approximately parallel to the bag front wall exterior 5 and its back side adjacent to the exterior of the bag front wall. In FIG. 3, the display panel 2 is pivoted to an operating position away from the bag front wall 5 with its display 24 properly oriented and in the line of sight of the operator/bag wearer so the display can be viewed and used. The back side of the display panel may have controls for operating the computer. The display panel may pivot freely because the display panel prop 22 is shown attached to the bag's front wall 5 ready for use but not yet engaged to the display panel.

The display panel may be removable from the bag. In this case, the bag and display panel may be pivotally joined with complimentary mounting attachments on the bag and display panel, also collectively known as "pivoting computer equipment mounts" (PCEM) 6, shown in FIG. 4. As shown in FIG. 5, one or more bag part PCEMs, also known as bag mounting attachments 29, are found on the bag 1 and one or more complimentary display panel part PCEMs, also known as display panel mounting attachments 26, are found on the display panel. The hinge means which allows pivoting may be part of the bag mounting attachment or part of the display panel mounting attachment or part of both. The PCEM leaves the back side of the display panel unobstructed so controls located there can be used.

The actual character of the PCEM may vary although all combinations serve to pivotally attach the display panel to the bag so that the display panel may rest in storage position with its front and back sides approximately parallel to the bag front wall or may be pivoted to an operating position in the line of sight of the operator/wearer for operation.

The PCEM hinge means may be capable of holding the angular position between the display panel and bag front wall with, for example, a ratchet or friction hinge. Instead, as in the case where the PCEM hinge means is a flexible fabric flap, the angular position between the display panel and bag front wall may be maintained using a display panel prop assembly designed to extending between the bag front wall and display panel back side and temporarily support the display panel in one or more viewing positions.

Because the display panel and bag have different life times, the display panel and bag may be separated for replacement or upgrading. The display panel 2 is of panel-like shape having front side 23 with display 24, an opposite back side which may have controls, an attachment edge 25 closest to the bag, a distal edge 27 opposite the attachment edge and two side edges 28. On or near the attachment edge there may be one or more display panel mounting attachments 26 which are the display panel portion of the PCEM and are complimentary to bag mounting attachments located on the bag and pivotally connect the bag and display panel, The bag computer's computing equipment, such as the computing unit, batteries and communication equipment may be located in the display panel. Alternatively, some or all of the computer equipment may be located on the exterior or in the interior of the bag and connected electrically with the display panel by, for example, an electrical wire 48 and associated plug(s). The computing unit may be removably mounted to a bag mounting assembly fixed to the inside surface of the bag's front. Much of the remainder of the bag's interior may be left unoccupied so it may be used to hold miscellaneous cargo and/or peripherals.

FIG. 6A shows the back side 9 of the display panel 2 where controls may be found and be available for use when the operator holds the display panel while using it while attached to the bag. These controls may include one or more touch pads 37, clickers, buttons 38, slides or other means to communicate with the computing unit with the hands.

The back side of the display panel may have prop holder, such as holes, sockets 39, clips 40, sliding fixtures, guides, runway, pins, or hinge means with mount to match and be complimentary to a display panel's prop bar end and used to support the display panel at one or more angles relative to the bag front wall.

There may be several display panel back side prop holders properly spaced and angled to prop up the display panel in the most commonly used positions. Different types of holders may be used to accommodate holding the display panel at various horizontal angles versus holding the display panel vertical and parallel to the bag front and prop bar. The prop holders may be partially or wholly inset into the display body and/or attachment on the attachment edge of the display panel. There may be molded-in prop position guides 56 to help the fingers engage the bar end into the right prop position on the back of the display with the hands without looking. The display panel may have a means of spacing the display panel back from the bag front, such as display panel edges extended toward the bag front beyond the plane of the display panel back side, legs, bumpers 49 or display panel mounting attachment extending toward the bag front from the display panel back side or a recessed area in the display panel back side to matching the prop holders and prop bar, so that the display panel, when in storage position, may lay approximately flat against the bag without interference from the display panel prop assembly.

The display panel back side may include finger guides 53 around or near specific controls to assist in finding these controls without looking. The finger guides may be in the form of molded in ridges around or near controls. As shown in FIG. 6B, a removable template 54 or frame with tactile finger guide 53 features may be used to indicate control positions. The template or frame may be rigid and include clips to attach it to the display panel or may be thin and attach to the display panel with adhesive or attachments that are part of the display panel. Display panel prop holders 41 may be included in a template or frame 54 which may be removable from the display panel. The finger guide and display panel prop holder may be combined on the same template or frame.

Shown in FIG. 5, the bag 1 has bag mounting attachments 29 on the bag's exterior surface to match the display panel mounting attachments on or near the attachment edge 25 of the display panel 2 and positioned and aligned to allow the display panel to pivot along a horizontal axis on the bag. Thus mounted the display panel may be parallel to the bag front wall in storage position or may be pivoted to an operating position in the line of sight of the operator/wearer when the bag computer is used.

The bag is comprised of a front wall 5, top wall 30 with opening with optional closure to gain access to the bag's interior, a bottom wall, side walls 32 and a back wall. The bag has a strap 34 for the operator/wearer to carry the bag for transport and to suspend or secure the bag on, for example, the operator's/wearer's shoulder, torso or waist while leaving the hands free for using the computer attached to the bag. The bag mounting attachments 29 to match the display panel mounting attachments may be found near the junction of the bag's top wall and front wall so the display panel and display may be positioned as close as possible to the operator/wearer's eyes when pivoted out into the line of sight of the operator for use. For example, the bag mounting attachment may be located on the bag's front wall proximal to the top wall, may be an extension of the bag's top wall over the front wall or may be attached to the bag's side walls as long as they allow the attached display panel to rest parallel to and approximately adjacent to the bag front wall for storage or pivot horizontally to an operating position in the line of sight of the operator/wearer for use.

The bag mounting attachments to match the display panel may be otherwise positioned on the front wall to pivotally hold on a horizontal axis and accommodate the display panel for storing and using.

The bag may have a cover, such as a cover flap 8 or rigid shaped cover, to cover, conceal, protect and secure the display panel in its storage place while on the bag front wall. The cover flap may be permanently and pivotally attached, for example by sewing or riveting, to the bag front wall near its center. In this position the cover flap may be pivoted on a horizontal axis up and over the display panel while in storage position next to the bag front wall and having fasteners 35 near the distal edge of the cover to close the cover to matching fasteners on the top of the front wall or front of the top walls. The cover may be rigid or semi-rigid and be shaped or molded to fit the display panel.

Alternatively, the cover may be permanently and pivotally attached to the top of the back wall, to the top wall or to the top of the front wall and fold down over the bag front wall and display panel stored there.

If the display panel has an electrical connection leading to other electrical equipment mounted on the interior of the bag, the bag may have an electrical connection or opening 47 in the bag part PCEM or in the bag front to facilitate electrical communication between the display and peripherals inside the bag.

The bag may have further mounting structures on the interior or exterior of the bag to install and hold batteries, peripherals, computing unit, communication equipment or other computing equipment to the bag where is may be electrically connected and used in conjunction with the display panel. The mounting structure may be located on the inside of the bag's front wall so as to leave the majority of the bag's interior vacant and available for miscellaneous cargo and/or peripherals.

The exterior of the bag front wall 5 may have one or more prop holders 41, such as a socket, pins, sewn on loop, metal or plastic bearing or other receiver, holder or attachment to match and be complimentary to the prop bar 10 first end 12. The prop holder may hold the prop bar semi-permanently and pivotally so that it may be ready to attach the opposite prop bar second end 13 to the display panel and support the display panel at one or more angles relative to the bag front wall. The area on the bag front around the prop holder may be reinforced, for example with redoubled material or with heavier material, so that the bag front material does not bend under the weight of the display panel against the prop and bag front. In the case where a computing unit is mounted to the inside of the bag's front wall, the computing unit's body may be positioned to support the prop holder.

The bag may have provision to mount a manual character input device, such as a keyboard or electronic write pad, to the inside of the cover or to a separate pivoting computer equipment mount located on the bag front.

There may be several prop holders on the bag front properly spaced and angled to prop up the display panel in the most commonly used positions. These may be combined into one fixture or strip which may be mounted to the bag front.

The bag and display panel may be pivotally joined with complimentary mounting attachments, also collectively known as pivoting computer equipment mounts (PCEM). One or more bag part PCEMs, also known as bag mounting attachments, are found on the bag and one or more complimentary display panel part PCEMs, also known as display panel mounting attachments, are found on the display panel. The hinge means which allows pivoting may be part of the bag mounting attachment or part of the display panel mounting attachment or part of both.

FIGS. 7A and 7B show there may be a single display panel mounting attachment on or near the attachment edge 25 of the display panel 2 so that it may pivot by one edge independently of the cover. The attachment may plug-in as with a post and clip attachment 60 or its complementary fixture and matching the pivoting bag mounting attachment 61 on the bag 1. The post and clip attachment has one or more pins or flat bars to align and strengthen the connection while one or more clips hold the two parts together. Examples include side release buckles and common suitcase clasps. Alternatively, the attachment may be loop and hook, zipper or other suitable attachment.

As shown in FIGS. 5A and 5B the display panel mounting attachment may be designed to engage laterally using, for example, a channel 62, track, rail or lateral hooks on the display panel 2 attachment edge 25 which match a complimentary laterally engaging pivoting bag mounting attachment 29 which is mounted to the bag 1 with a hinge means such as a short flap of flexible fabric 87.

Figure 9B:
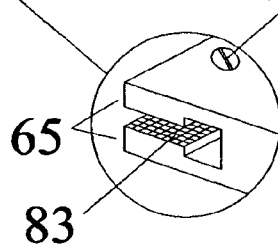
FIG. 9B This is a magnified view of the PCEM clamp attachment with jaws which flex but not pivot.

As shown in FIGS. 9A and 9B, the display panel mounting attachment holding the display panel 2 to the bag may consist of a clamp on the attachment edge 25. The clamp has two jaws 65 between which the bag's 1 matching pivoting bag mounting attachment 87, such as flexible fabric or flange from a bag's hinge means, is placed. The jaws may be tightened with a clip, screws or other fastener means 67. The jaws may be made of one semi-rigid molded piece forming a slot and used a fastener to tighten the jaws around the bag's mounting attachment. The bag mounting attachment hinge means would usually be a flexible fabric so it can easily be sewn or riveted to the bag front wall.

Figure 9C:
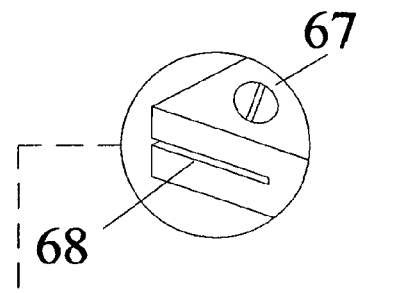
FIG. 9C This is a magnified view of the PCEM with a slot to match the end of flexible fabric hinge on the bag.

Instead, as shown in alternative jaw configuration FIG. 9C, the display panel mounting attachment clamp may be one or more slots 68 in the attachment edge, recessed areas in the front or back sides of the attachment edge, shaping and/or holes to accept a mounting plate/bracket on the bag's mounting attachment. The plate/bracket from the bag may be secured to the display panel with screws, bolts, pins clips or other fastener 67 with matching holes in/through the display panel and plate/bracket.

Figure 9D:
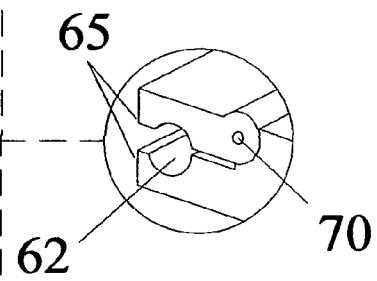
FIG. 9D This is a magnified view of the PCEM clamp attachment with one pivoting jaw and shaping to match the flexible fabric hinge on the bag.
Figure 9E:
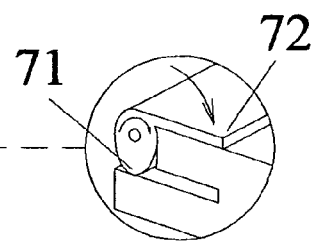
FIG. 9E This is a magnified view of the PCEM clamp attachment with one pivoting clamp jaw with lever to pry the jaw into place against a flexible fabric hinge on the bag.

As shown in alternative jaw configuration, FIG. 9D, the display panel mounting attachment clamp may also have two separate jaws. One or both of these jaws 65 may be hinged 70 together so they can be opened to accept the bag's mounting attachment. The jaws may have a spring to hold the jaws closed. A clip or other fasteners may be included to hold the jaws closed and there may be one or more release buttons which may be recessed to avoid accidental release. Shown in FIG. 9E, one of the display panel mounting attachment jaws may be a pivoting clamp 71 such as a cam lobe jaw, short lever or other pivoting clamp jaw with an attached lever 72 to at once pivot, tighten and lock the jaw in place to the opposing stationary jaw and clamp to the flexible fabric bag mounting attachment.

Figure 9F:
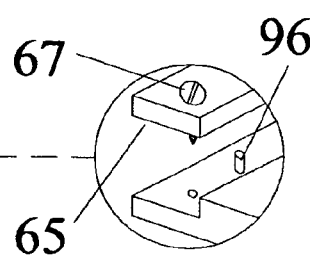
FIG. 9F This is a magnified view of the PCEM clamp attachment with one clamp jaw separable from the other.

As shown in alternative jaw configuration for the display panel mounting attachment, FIG. 9F, the clamp may have one removable jaw 65 and this may be tightened to the other jaw with screws, bolts, releasable clips or other fasteners 67.

The inside of any clamp jaws may be shaped to match the bag mounting attachment. The jaws may form a channel, FIG. 9D 62, to match a bar, rope, thickened hem or other ledge on the distal edge of a flexible fabric bag mounting attachment. The jaws may have a gripping surface such as knurling FIG. 9B 83, teeth or ridges to grip a plain flexible fabric bag mounting attachment. The jaws may have matching projections FIG. 9F 96 and sockets/holes to match, for example, perforations in a flexible fabric bag mounting attachment.

The display panel mounting attachment on or near the attachment edge 25, shown in FIGS. 10A and 10B, may be a half hinge such as a bearing or an axle 63 connected near the display panel 2 attachment edge 25 and designed to match a bag mounting attachment such as a complimentary half hinge bearing 79 or axle on the bag 1. The half hinge bearing may be made of flexible material and split lengthways 64 so the axle can snap into place.

FIGS. 11A and 11B show that there may be two display panel mounting attachments on or near the attachment edge, one near the right and one near the left sides of the display panel's 2 attachment edge 25. The attachments may be half hinges such as one or more bearings or axles 63 connected to the display panel's 2 attachment edge 25 and matching a complimentary bag mounting attachment half hinges on the bag 1. The display panel mounting attachment's axles may be designed to be secured to the bag with complimentary bag mounting attachment half hinge on exterior of the bag top wall or front wall which may be straps 78 threaded through the display panel axles, folded back and fastened to the bag with matching fasteners 67, such as snaps, hook and loop or buttons, and allowing the display panel to pivot horizontally.

Further pivoting computer equipment mount examples, shown in FIGS. 12A, 12B, 13A, 13B, 13C and 13D, may include snaps, buttons 73, buckles, hooks, clips, side release buckles 74, or other attachment means on or near the display panel's 2 attachment edge 25 which are complimentary to attachments, such as button holes 88 in a flexible fabric hinge means 87 or pivoting side release buckles 92, located on the bag 1.

FIGS. 14A and 14B show that the display panel mounting attachment half hinge may be one or more half hinge bearings 79 on or near the attachment edge 25 of the display panel 2 matching a bag mounting attachment half hinge bearing 93 on the bag 1 and secured together with a removable axle 63. The attachments may be molded into the display panel or separate attachments may be secured to it.

The display panel mounting attachment may be pivotally secured to the display panel using one or more hinge means 94 on or near the display panel's 2 attachment edge 25 as shown in FIGS. 15A and 15B. The hinge may be capable of holding its angular position without using the hands. There may be one or more axle and bearing assemblies secured to or near the display panel's attachment edge and these may include one or more attachments such as a hanger blade, double hanger bars, bracket, pins 81, sockets or other attachment means designed to match the complimentary bag mounting attachments 95 on the bag 1.

FIGS. 16A and 16B show that the display panel mounting attachment hinge means may be flexible fabric 87 clamped, screwed crimped or otherwise fastened to or near the attachment edge 25 of the display panel 2. The flexible fabric hinge means may be plain and adapted to match a bag mounting attachment clamp 84 fixed to the outside of the bag 1 so as to allow the display panel to pivot horizontally over the bag front. The flexible fabric hinge means may have one or more grip improvement features such as a bar, rope, thickened hem or other ledge on its edge to match the bag's clamp jaws. The grip improvement feature may be perforations 85 in the flexible fabric hinge means to match projections in the bag's clamp jaws.

As shown in FIGS. 17A and 17B, the display panel 2 mounting attachment flexible fabric hinge means 87 on or near the attachment edge 25 may have one or more attachments along its free edge which match bag mounting attachments the bag 1. There may be one attachment such as a channel 62, track, rail, zipper, post and clip, lateral hooks, loop and hook or other suitable attachment which matches the corresponding bag mounting attachment 95 on the bag.

Instead, as in FIGS. 18A and 18B, there may be two or more display panel mounting attachments such as buttons, button holes 88, snaps, side release buckles or other fasteners on the flexible fabric 87 attached to or near the display panel 2 attachment edge 25 and matching a complimentary bag mounting attachment 91 on the bag 1. As shown in this figure, the display panel is in storage position parallel to and adjacent to the exterior of the bag's front wall.

Shown in FIGS. 19A and 19B, the flexible fabric display panel mounting attachment on or near the display panel 2 attachment edge 25 may be divided in two forming tabs 89, buckle straps or similar attachment supports near the right and left sides of the display panel attachment edge. Attachments may include snaps 90, buttons, button holes, buckles, buckle holes, loop and hook or other attachment means which match bag mounting attachments 91 on the bag 1.

One disadvantage of using a flexible fabric or other very simple hinge means in the pivoting computer equipment mount is that these may not hold the display panel's angular position relative to the bag front if the operator wants to, for example, view his computer without using his hands or type while looking at the display. A way of correcting this problem while still keeping the advantage of a simple pivoting computer equipment mount (PCEM) is to use a display panel prop assembly to temporarily hold the display panel's position. The display panel and bag front can be adapted to be used in combination with a prop bar for this purpose. As shown in FIGS. 20A and 20B, the display panel prop assembly is comprised of a prop bar 10, such as a rod, bar or pole, which may be positioned between one prop holder 41 located on the bag 1 front 5 and a second prop holder 41 located on the display panel 2 back side 9. There may be one or more holders on the display panel back side and/or bag front for holding the display panel at different angles. On either the display panel back or bag front several prop holders may be combined into a single fixture. There may be different forms of prop holders and the forms may be mixed to produce the desired result. In any one form of display panel prop assembly the positions of the prop holders may be reversed relative to the display panel and bag front. For example, a display panel prop assembly may consist of a pivoting prop holder on the bag front and a bar end prop holder on the display back or, instead, the pivoting prop holder may be on the display back and the bar end prop holder on the bag front. A prop holder may be attached to the bag front by, for example, sewing, riveting, screwing, gluing or other means of attachment and may include a flange or other means to abut the bag front and assist in attachment. A prop holder may be attached to the display panel back side by, for example, molding it into the display panel or fastening on a separate holder with fasteners, glue or other fastening means. There may be one or more display panel prop assemblies. The display panel prop assembly can come in several forms:

In one embodiment, the prop holder 41 is a "bar end prop holder". A bar end prop holder holds the end of the prop bar 10 by attaching complimentary prop bar end 12 and bar end prop holder 41 attachment fittings. Possible bar end prop holder types include sockets, notches, pins, hooks, slots, sewn on pockets, or other holder which may fit the complimentary prop bar end and hold the prop bar between the bag front and display panel back side while the display is in use. The holder may be angled to fit the prop bar. The holder may be designed to have the prop bar end snap into place.

In a simple form of the display panel prop assembly, there may be one or more bar end prop holders on the display panel back side and one or more bar end prop holders on the bag front. A removable prop bar 10 spans between the two holders and holds the display panel in a specific angle relative to the bag front.

To hold the display panel near vertical, a "vertical prop holder" 15 may be used and this may be different and may be adapted to holding the prop bar parallel to the display panel back side and bag front so that the display panel may be held in a position 180 degrees from its storage position. A vertical prop holder may be found on either the bag front or the display back. A vertical prop holder may be made to hold the prop bar by its bar length or end 13 with, for example, a clip/snap fitting, lateral hook, pin, socket, cylinder 51 or slot parallel to the display back or bag front, ring or split cylinder of flexible material.

Instead, as shown in FIGS. 21A and 21B, the prop holder may be a "pivoting prop holder" 44. A pivoting prop holder is fixed to the bag 1 front 5 or display panel 2 back side 9, holds the prop bar end 12 and allows the prop bar to pivot, usually on a horizontal axis, while being held to the bag front or display panel back side. Here it can be seen that the prop bar is comprised of a first end 12, a second end 13 and a bar 10 length connecting the two ends.

The pivoting prop holder may include a hinge means with a fastener complimentary to the prop bar end or may include an axle or bearing 79 which is complimentary to and accepts an axle 63 or bearing on the prop bar end 12. Examples of a pivoting prop holder include a flap with fitting to match the prop bar, loop or band of bag material 79, metal or plastic forming a bearing, axle/bearing hinge with fitting to match the prop bar, ball and socket joint with fitting to match the prop bar or other holder that may pivotally hold the prop bar to the bag front or display back side when stored and not in use while, alternatively, allowing the prop bar to pivot 45 into use position when needed. A pivoting prop holder in the form of a loop may have a fastener to open it and allow the insertion of a stirrup type prop bar end.

A pivoting prop holder 44 may be located on the display panel back closer to the PCEM attachment between the display panel and bag front than to the display panel distal edge 27. If the pivoting prop holder is located on the bag front, it may be located closer to the PCEM 6 than to the place 50 on the bag where the display panel distal edge would rest when the display panel is in storage position against the bag front. This positioning allows the prop bar to be longer without being exposed beyond the display panel and allows the bar to engage a holder on the display panel back in a larger number of angles including vertical above the bag top.

When a first end of the prop bar is pivotally held to the bag front, the one or more holders for the second prop bar end may be sockets 41, notches, pins, hooks, slots, sewn on pockets, or other holder which may fit the complimentary prop bar end and hold the prop bar between the bag front and display panel back side while the display is in use. As shown, the display panel may be pivoted from a storage position approximately parallel to and against the bag front to a vertical operating position 180 degrees from storage position so the operator/wearer may view the display from behind the bag. A vertical prop holder may be used for holding the display panel in vertical position and, as shown, an example may be a lateral hook 52 adapted to hold the prop bar 10 along its bar length instead of by its end. Because the prop bar engages the lateral hook from the side 55 with the prop bar parallel to and moving parallel to the display panel back side, the prop bar is easily engaged but cannot easily come free under normal operating conditions. The attachment of the vertical prop holder, such as a lateral hook, to the prop bar length instead of one of the ends leaves excess prop bar length between the vertical holder and the prop bar ends so the prop bar acts as a lever to hold the display panel vertical.

The prop bar ends match and fit into the prop holder located on the bag front with one end and the prop holder located on the display panel back side with the other end. The prop bar 10 may be made of rigid or semi-rigid material and may be removable from the holders and replaceable.

Either end of the prop bar end 13 may have a point, ball, hook, shovel shape or other fixture complementary to the prop bar end prop holder. The prop bar end may be split, flattened, tapered or otherwise shaped for jamming into the matching holder where it may be held by friction. The prop bar end may be designed to snap into the prop holder. The prop bar end may have a hook, notch, projection or other shape to match some fixture on and temporarily hold the prop bar to the prop holder. The bar length of the prop bar may be adapted to match a vertical prop holder.

A prop bar end 12 may be formed into a feature complimentary to a prop holder 79 and adapted to allow the bar to pivot when held to the bag front or display panel back side so that it may be stored there or, if needed, quickly pivoted into use. Such a prop bar end to match a prop holder may be a "T", "L" 95, stirrup shaped, hooked, snap in bearing, axle, ball or socket, flexible fabric attached to the prop bar and including an attachment on the fabric complimentary to the bag prop holder, for example a snap, hook and loop patch or button hole, or other shape that, when fitted to the complimentary fitting on the pivoting prop holder, will allow the bar to pivot, normally on a horizontal axis. The prop bar end may have a retainer such as a snap, hook, clip or barb to retain the bar in the prop holder.

In a second embodiment, shown in profile view FIGS. 22A, 22B, 22C, 22D, 22E and front view 22F, the bag 1 computer, in various positions for operation, is shown with the display panel held to the bag with a pivoting computer equipment mount (PCEM) 6 and the display panel prop assembly is between the bag front and display panel back. The prop bar 10 is made of a semi rigid material and has a fitting to match a pivoting prop holder 44 at one end 12. The remainder of the prop bar is designed to pass through a complimentary "sliding prop holder" 42 which, because of friction or ratcheting between the prop bar and sliding prop holder, can hold the bar at any distance from its connection with the pivoting prop holder. The position of the sliding prop holder on the prop bar decides the display panel angle relative to the bag front. The sliding prop holder 42 may have the form of a channel, track, slot or cylinder parallel to the display panel 2 back side or bag front 5, depending where it is mounted. The sliding prop holder may have a friction or ratchet surface within it that matched the prop bar friction or ratchet surface 46 so that the display panel may pivot only with some force and can hold any angular position between the display panel and bag front.

The prop bar made to match the sliding prop holder may be semi-flexible to allow the bar to enter the sliding prop holder at the proper angle while the display panel is in a variety of positions. The bar may have a size and surface features 46 along its bar length to work in conjunction with the sliding prop holder to create the proper friction or ratcheting. One end of this prop bar matches a pivoting prop holder 44.

Instead of using friction to hold the prop bar in place in the sliding prop holder, there may be a lock 17 associated with the sliding prop holder 42 and complimentary prop bar 10. The operator may engage the lock if he want the display to hold one angular position. Otherwise, the display swings freely.

Examples of locking mechanisms may include a sliding switch, a button 17 or a lever which can be operated conveniently from the edge of the display panel.

In a third embodiment of the display panel prop assembly, shown in profile views FIGS. 23A, 23B, 23C, 23D, 23E and front view 23F, the bag 1 computer, in various positions for operation, is shown with the display panel held to the bag with a pivoting computer equipment mount (PCEM) 6 and the display panel prop assembly is between the bag front and display panel back. The prop bar 10 is rigid and has a pivoting prop holder permanently fixed to one end. The pivoting prop holder would normally be comprised of an axle/bearing hinge 19 and includes a friction, spring or ratchet mechanism which can maintain the angle between the bag front and prop bar with enough force to support the display panel 2. The pivoting prop holder is attached to the bag 1 front wall 5 or display panel back side and may include a flange 21 to aid attachment and to stabilize the prop holder.

The prop bar end 12 not attached to the pivoting prop holder is designed to pass through or rub against a sliding prop holder 42 and adjusting for slack produced by the pivoting of the display panel. The sliding prop holder may have the form of a channel, track, slide, rubbing strip, slot or cylinder parallel to the display panel back side or bag front, depending where it is mounted. The sliding prop holder need not include a friction or ratcheting mechanism.

As shown in profile views FIGS. 24A, 24B, 24C, 24D and front view 24E, one prop holder may be eliminated with the prop bar end 12 rubbing directly on the bag front or display panel back. In the case shown, the bag computer, shown in various positions for operation, has the display panel 2 held to the bag 1 with a pivoting computer equipment mount (PCEM) 6 and the display panel prop assembly is between the bag front and display panel back. The prop bar 10 is rigid and has a pivoting prop holder permanently fixed to one end. The pivoting prop holder would normally be comprised of an axle/bearing hinge 19 and includes a friction or ratchet mechanism which can maintain the angle between the display panel back side and prop bar with enough force to support the display panel at various angles. The end of the prop bar not having the pivoting prop holder rubs directly on the exterior of the bag front wall 5 and the prop bar may be adapted in size, shape, long dimension or end characteristics to rub against the bag front and hold the display panel at desired angles. One or more bumpers 49 may be include on the display back side to provide room for the display panel prop assembly.

As shown, the pivoting prop holder pivot point 19 may be located on the display panel back closer to the PCEM 6 than to the display panel distal edge 27. This allows the prop bar to be completely hidden behind the display panel when stored and allows the prop bar to be long enough to support the display panel 2 in a larger number of angles, including the vertical position, shown in FIGS. 24D and 24E.

The invention claimed is:

1. A self-contained, wearable computer comprising:
   a) a bag having a front wall and a top wall including a top opening for providing access to the interior of the bag wherein each wall has an inside surface and an outside surface;
   b) one or more prop holders located on the outside surface of the front wall of said bag;
   c) a display panel with a front side, an opposite back side, and an attachment edge, wherein a display is located on the display panel front side;
   d) one or more prop holders located on back side of the display panel;
   e) a pivoting computer equipment mount attaching the display panel to the bag so that the display panel may pivot on a horizontal axis from a storage position parallel to and adjacent to the exterior of the bag's front wall to an operating position away from the bag front with the display in the line of sight of an operator/wearer; and
   f) a prop positioned between one or more display panel prop holders and one or more bag prop holders to temporarily hold the display panel at one or more angles relative to the bag front.

2. The computer of claim 1 wherein the pivoting computer equipment mount holds the display panel with its back side nearest to the bag front wall exterior when in the storage position.

3. The computer of claim 1 wherein the display panel is removable from the bag at the pivoting computer equipment mount.

4. The computer of claim 3 wherein the pivoting computer equipment mount is comprised of a bag mounting attachment on the bag and a display panel mounting attachment on the display panel wherein the bag mounting attachment and display panel mounting attachment are complimentary and removably attach the display panel to the bag.

5. The computer of claim 1 wherein a prop holder is a pivoting prop holder adapted to pivotally hold the prop to the bag front or display panel back side.

6. The computer of claim 1 wherein the prop holder includes a hinge means and an attached prop wherein the hinge means includes a mechanism to hold any angular position while supporting the display panel.

7. The computer of claim 1 wherein the prop holder is a vertical prop holder designed to fit and hold the prop and hold the display panel parallel to the bag's front wall and 180 degrees from the storage position.

8. The computer of claim 7 wherein the vertical prop holder is adapted to engage the prop by its length.

9. The computer of claim 1 wherein the prop holder is a sliding prop holder adapted to fit and slide along the prop length wherein the interface between the sliding prop holder and prop length provides resistance to movement sufficient to hold the display panel at any angle.

10. The computer of claim 1 wherein a prop end is adapted to allow the prop to pivot while held in a prop holder.

11. The computer of claim 1 wherein the prop length is adapted to fit and slide along a sliding prop holder wherein the interface between the sliding prop holder and prop length provides resistance to movement sufficient to hold the display panel at any angle.

12. The computer of claim 1 wherein the display panel back side has a recessed area to accommodate the volume of the display panel prop assembly and allow the display panel to be in the storage position adjacent to and parallel to the bag front.

13. The computer of claim 1 wherein the one or more display panel prop holders are part of a frame removably attachable to the display panel.

14. The computer of claim 13 wherein the frame includes finger guides matching controls on the display panel back side.

15. A self-contained, wearable computer comprising:
   a) a bag having a front wall and a top wall including a top opening for providing access to the interior of the bag wherein each wall has an inside surface and an outside surface;
   b) a display panel with a front side, an opposite back side, and an attachment edge, wherein a display is located on the display panel front side;

c) a pivoting computer equipment mount attaching the display panel to the bag so that the display panel may pivot on a horizontal axis from a storage position parallel to and adjacent to the exterior of the bag's front wall to an operating position away from the bag front with the display in the line of sight of an operator/wearer; and d) a prop pivotally attached to the back side of the display panel with a hinge means wherein the prop is adapted to rub against the bag front and temporarily hold the display panel at one or more angles relative to the bag front.

16. The computer of claim 15 wherein the pivoting computer equipment mount holds the display panel with its back side nearest to the bag front wall exterior when in the storage position.

17. The computer of claim 15 wherein the display panel is removable from the bag at the pivoting computer equipment mount.

18. The computer of claim 17 wherein the pivoting computer equipment mount is comprised of a bag mounting attachment on the bag and a display panel mounting attachment on the display panel wherein the bag mounting attachment and display panel mounting attachment are complimentary and removably attach the display panel to the bag.

19. The computer of claim 15 wherein the display panel back side has a recessed area to accommodate the volume of the display panel prop assembly and allow the display panel to be in the storage position adjacent to and parallel to the bag front.

20. The computer of claim 15 wherein the one or more display panel prop holders are part of a frame removably attachable to the display panel.

21. The computer of claim 20 wherein the frame includes finger guides matching controls on the display panel back side.

22. A self-contained, wearable computer comprising:

a) a bag having a front wall and a top wall including a top opening for providing access to the interior of the bag wherein each wall has an inside surface and an outside surface;

b) a display panel with a front side, an opposite back side, and an attachment edge, wherein a display is located on the display panel front side;

c) a pivoting computer equipment mount attaching the display panel to the bag so that the display panel may pivot on a horizontal axis from a storage position parallel to and adjacent to the exterior of the bag's front wall to an operating position away from the bag front with the display in the line of sight of an operator/wearer; and d) a prop pivotally attached to the bag front with a hinge means wherein the prop is adapted to rub against the back side of the display panel and temporarily hold the display panel at one or more angles relative to the bag front.

23. The computer of claim 22 wherein the pivoting computer equipment mount holds the display panel with its back side nearest to the bag front wall exterior when in the storage position.

24. The computer of claim 22 wherein the display panel is removable from the bag at the pivoting computer equipment mount.

25. The computer of claim 24 wherein the pivoting computer equipment mount is comprised of a bag mounting attachment on the bag and a display panel mounting attachment on the display panel wherein the bag mounting attachment and display panel mounting attachment are complimentary and removably attach the display panel to the bag.

26. The computer of claim 22 wherein the display panel back side has a recessed area to accommodate the volume of the display panel prop assembly and allow the display panel to be in the storage position adjacent to and parallel to the bag front.

27. The computer of claim 22 wherein the one or more display panel prop holders are part of a frame removably attachable to the display panel.

28. The computer of claim 27 wherein the frame includes finger guides matching controls on the display panel back side.

29. The computer of claim 15 wherein the hinge means includes a mechanism to hold any angular position while supporting the display panel.

30. The computer of claim 22 wherein the hinge means includes a mechanism to hold any angular position while supporting the display panel.

* * * * *